United States Patent Office 3,732,208
Patented May 8, 1973

3,732,208
STARCH ETHERS AND METHOD OF PREPARING SAME
Edwin L. Speakman, Clinton, Iowa, assignor to Standard Brands Incorporated, New York, N.Y.
No Drawing. Filed Mar. 13, 1972, Ser. No. 234,417
Int. Cl. C08b 19/06
U.S. Cl. 260—233.3 R      14 Claims

ABSTRACT OF THE DISCLOSURE

The disclosure is directed to carboxyphenyl ethers of starch and to a method of preparing the same. The carboxyphenyl ethers of starch will gelatinize or disperse readily by heating in water to form pastes having relatively stable viscosity. Also, the carboxyphenyl ethers of starch have good film forming characteristics.

---

This invention relates to carboxyphenyl ethers of starch and to a method of preparing the same. More particularly, the invention relates to carboxyphenyl ethers of starch in granule form.

In the prior art, the preparation of a number of aryl derivatives of starch is disclosed. These derivatives are for the most part of the aryl alkyl halide type. U.S. Pat. 2,555,469 to Jones discloses reacting sodium α-chloro-p-toluene sulfonate with starch. U.S. Pats. 2,773,057 and 3,062,810 to Hjermstad disclose reacting benzyl chloride with starch in an alkaline slurry. Reactions of chlorobenzyl chloride with starch are described by Talley et al. in USDA Bulletin AIC-261 (1950) and reactions of p-nitrobenzyl chloride with starch are described by Pancirolli, Chem. Abstracts, 31, 7247.

U.S. Pats. 3,499,886 to Mehltretter and 3,513,156 to Speakman disclose o-aminobenzoyl esters of starch. Diazonium salts of esters of starch and anthranilic acid and diazonium salts of esters of starch and derivatives of anthranilic acid are disclosed in U.S. Pat. 3,511,830 to Speakman.

The principal object of this invention is the preparation of carboxyphenyl ethers of starch.

Another object of the present invention is the preparation of carboxyphenyl ethers of starch in granular form.

Still another object of the invention is the preparation of carboxyphenyl ethers of starch from diazonium salts of esters of starch which have been cross-linked.

Other objects will become apparent from the following description.

The carboxyphenyl ethers of starch of the present invention are prepared from a starch product of the following type:

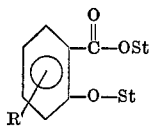

where St is starch and where R is a radical selected from the group consisting of:

(A) a hydrocarbon radical selected from the group consisting of alkyl, alkenyl, alkynyl, cycloalkyl, cycloalkenyl, aryl,
(B) a radical selected from the group consisting of hydrogen, alkoxy, aryloxy, amino, acyl, aldehydo, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido,
(C) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxyl, hydroxyl, carboalkoxy, alkoxy, polyalkoxy, guanido, imino, primary and secondary amino, and
(D) a heterocyclic radical containing two to six carbon atoms and one or more atoms of oxygen, nitrogen and sulfur.

Specific examples of R radicals which may be present are hydrogen, 4-methyl, 4-phenyl, 4-(p-methylphenyl)-4-(2-phenylethyl), 4-methoxy, 4-methylamino, 4-acetyl, 4-aldehyde, 4-acetamido, 4-acetoxy, 4-carboxymethyl, 4-carboxy, 4-carbomethoxy, 4-carboxyvinyl, 4-cyano, 4-carbamyl, 4-cyclohexyl, 4-epoxyethyl, 4-chloro, 4-hydroxy, 4-nitro, 4-sulfo, 4-ureido, as well as various substituted derivatives such as 4-chloromethyl, 4-(p-hydroxyphenyl), 4-chloromethoxy, 4-chloroacetamido, 4-chloroacetoxy, 4-(N-methylureido), iminoethyl and aziridinylethyl.

Methods for producing a starch product of the above type are described in U.S. Pats. 3,513,156 and 3,511,830 to Speakman.

To obtain the carboxyphenyl ethers of starch of the present invention from the starch products described above, the starch product is subjected to alkaline conditions, preferably in an aqueous medium.

The aforementioned starch product under alkaline conditions hydrolyzes, thereby cleaving the ester linkage which results in a carboxyphenyl ether of starch of the following general formula:

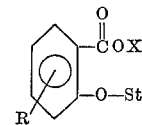

where X is either a salt forming ion or hydrogen and R is a radical as identified above. Exemplary of salt forming ions which may be present are Na$^+$, K$^+$, Li$^+$, NH$_4^+$ and the like.

The term "starch" as used herein includes all raw starches such as corn, tapioca, potato, wheat, sago, arrowroot, rice, and the like, and various modified starches and derivatives of starch, such as oxidized starches, starch esters, starch ethers, and the like, the only requirement being that the starch contain free hydroxyl groups. The preferred starch used for preparing the carboxyphenyl ethers of starch is a modified starch in granular form which has been acid treated.

The exact conditions under which the hydrolysis is performed may vary somewhat. Temperature, time of reaction and pH of the medium are interdependent variables. At high temperatures and high pH's the reaction will proceed rapidly while at lower temperatures and lower pH's the reaction will proceed more slowly. When a carboxyphenyl ether of starch is desired in granular form, temperatures in the range of from ambient to about 135° F. are preferred. Higher temperatures may be employed when starch gelatinization inhibitors are present, such as NaCl, Na$_2$SO$_4$ and the like. The pH of the medium may preferably vary from about 9 to about 11.

When the carboxyphenyl ether of starch shown above is in an alkaline medium, X will be a salt forming ion and when it is in an acidic medium, X will be hydrogen.

The preferred carboxyphenyl ethers of starch of the present invention have a D. of S. of less than about 0.1 carboxyphenyl groups per anhydroglucose unit. D. of S. is the abbreviation for Degree of Substitution which is the number of carboxyphenyl groups per anhydroglucose unit, the molecular weight of the anhydroglucose unit being 162. The most preferred carboxyphenyl ether of starch has a D. of S. in the range of from about 0.001 to about 0.02 carboxyphenyl groups per anhydroglucose unit.

The carboxyphenyl ethers of starch show unusual properties compared to the properties of the cross-linked starch products from which they are prepared. For example, the carboxyphenyl ethers of starch will gelatinize or disperse readily by heating in water to form a paste having a relatively stable viscosity. Also, the carboxyphenyl ethers of starch have good film forming characteristics.

In order to more clearly describe thet nature of the present invention a specific example will hereinatfer be described. It should be understood, however, that this is done solely by way of example, and is intended neither to delineate the scope of the invention nor limit the ambit of the appended claims. In the example and throughout this specification, percentages refer to percent by weight and are based on the dry substance weight of the starch present, unless otherwise specified.

EXAMPLE

This example illustrates the preparation of a carboxyphenyl ether of starch.

Sufficient granular 431 fluidity acid-modified cornstarch (the fluidity of the starch was measured according to the method disclosed in Cereal Chemistry, 36, pp. 108–127 (March 1959), entitled "The Estimation of Starch Paste Fluidities" by W. R. Fetzer and L. C. Kirst) was suspended in water to provide 6 liters of slurry containing 35.5 percent starch. The cornstarch had a carboxyl content of 0.11 percent and a nitrogen content of 0.045 percent. The slurry was transferred to a reaction vessel equipped with a stirrer and the vessel was placed in a constant temperature bath adjusted to maintain a slurry temperature of 130° F. When the slurry reached this temperature, sufficient sodium hydroxide solution was added to adjust the pH to 8.0 (determined at 130° F.) and incremental addition of isatoic anhydride was started. The total amount of isatoic anhydride added was 4 percent. After each addition of isatoic anhydride, the slurry pH was adjusted by the addition of sodium hydroxide solution to maintain the pH in the range of 7.8 to 8.2. The total time for the additions was about 18 minutes. The reaction temperature was maintained and stirring continued for 30 minutes after the final addition of the anhydride, during which time the pH of the slurry was maintained in the indicated range by the occasional addition of sodium hydroxide solution. The slurry was then acidified to a pH of 5.6 by the addition of hydrochloric acid. The nitrogen content of the starch ester was 0.351 percent.

Sufficient sodium nitrite was added to the slurry to obtain therein a concentration of 1.7 percent sodium nitrite. The pH of the slurry was adjusted to about 2 by the addition of hydrochloric acid and held at this pH for 30 minutes with constant stirring. A sufficient amount of a solution of sodium hydroxide was added to the slurry to obtain a pH therein of 5.7. The cross-linked starch at this point had a nitrogen content of 0.085 percent.

The pH of the slurry was then adjusted to 10.5 by the addition of 2 percent sodium hydroxide solution and maintained at a temperature of 130° F. and a pH of about 10.5 for 5 hours.

The pH of the slurry was then adjusted to about 5.8 by the addition of hydrochloric acid, and the slurry filtered; the filtrate was washed and dried to between 10 and 13 percent moisture content in a forced circulating air model Proctor and Schwartz drier at an air temperature of 160° F. The carboxyl content of the product was 0.32 percent and the D. of S. was 0.0076 carboxyphenyl groups per anhydroglucose unit.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A carboxyphenyl ether of starch having the following formula:

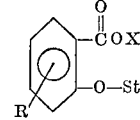

where St is starch, where X is a salt forming ion or hydrogen and where R is a radical selected from the group consisting of:
   (A) a hydrocarbon radical selected from the group consisting of alkyl, alkenyl, alkynyl, cycloalkyl, cycloalkenyl, aryl,
   (B) a radical selected from the group consisting of hydrogen, alkoxy, aryloxy, amino, acyl, aldehydo, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido,
   (C) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl carboxyl, hydroxyl, carboalkoxy, alkoxy, polyalkoxy, guanido, imino, primary and secondary amino, and
   (D) a heterocyclic radical containing two to six carbon atoms and one or more atoms of oxygen, nitrogen and sulfur.

2. A carboxyphenyl ether of starch as defined in claim 1, wherein R is hydrogen.

3. A carboxyphenyl ether of starch as defined in claim 1, wherein the carboxyphenyl ether of starch is in granular form.

4. A carboxyphenyl ether of starch as defined in claim 2, wherein the carboxyphenyl ether of starch is in granular form.

5. A carboxyphenyl ether of starch as defined in claim 3, wherein the carboxyphenyl ether of starch has a D. of S. of less than about 0.1 carboxyphenyl groups per anhydroglucose unit.

6. A carboxyphenyl ether of starch as defined in claim 4, wherein the carboxyphenyl ether of starch has a D. of S. of less than about 0.1 carboxyphenyl groups per anhydroglucose unit.

7. A carboxyphenyl ether of starch as defined in claim 5, wherein the carboxyphenyl ether of starch has a D. of S. of from about 0.001 to about 0.02.

8. A carboxyphenyl ether of starch as defined in claim 6, wherein the carboxyphenyl ether of starch has a D. of S. of from about 0.001 to about 0.02.

9. A method of preparing a carboxyphenyl ether of starch comprising subjecting a cross-linked starch product represented by the following formula:

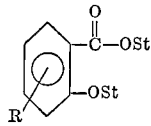

where St is starch and where R is a radical selected from the group consisting of
   (A) a hydrocarbon radical selected from the group consisting of alkyl, alkenyl, alkynyl, cycloalkyl, cycloalkenyl, aryl,
   (B) a radical selected from the group consisting of hydrogen, alkoxy, aryloxy, amino, acyl, aldehydo, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido,
(C) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxyl, hydroxyl, carboalkoxy, alkoxy, polyalkoxy, guanido, imino, primary and secondary amino, and
(D) a heterocyclic radical containing two to six carbon atoms and one or more atoms of oxygen, nitrogen and sulfur, to alkaline hydrolysis at a pH in the range of from about 9 to about 11 thereby forming a carboxyphenyl ether of starch having the following formula:

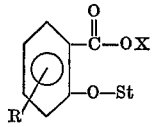

where St is starch, where X is a salt forming ion or hydrogen and where R is a radical selected from the group consisting of:
(A) a hydrocarbon radical selected from the group consisting of alkyl, alkenyl, alkynyl, cycloalkyl, cycloalkenyl, aryl,
(B) a radical selected from the group consisting of hydrogen, alkoxy, aryloxy, amino, acyl, aldehydo, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido,
(C) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxyl, hydroxyl, carboalkoxy, alkoxy, polyalkoxy, guanido, imino, primary and secondary amino, and
(D) a heterocyclic radical containing two to six carbon atoms and one or more atoms of oxygen, nitrogen and sulfur.

10. A method preparing a carboxyphenyl ether of starch as defined in claim 9, wherein the alkaline hydrolysis is performed in an aqueous medium having a pH in the range of from about 9 to about 11.

11. A method of preparing a carboxyphenyl ether of starch as defined in claim 10, wherein the alkaline hydrolysis is performed at a temperature in the range of from about ambient to about 135° F.

12. A method of preparing a carboxyphenyl ether of starch as defined in claim 11, wherein R is hydrogen.

13. A method of preparing a carboxyphenyl ether of starch as defined in claim 12, wherein the carboxyphenyl ether of starch has a D. of S. of less than about 0.1 carboxyphenyl groups per anhydroglucose unit.

14. A method of preparing a carboxyphenyl ether of starch as defined in claim 13, wherein the carboxyphenyl ether of starch has a D. of S. of from about 0.001 to about 0.02.

References Cited
UNITED STATES PATENTS
3,511,830   5/1970   Speakman _____ 260—233.5
3,513,156   5/1970   Speakman _____ 260—233.5

DONALD E. CZAJA, Primary Examiner

M. I. MARQUIS, Assistant Examiner

U.S. Cl. X.R.
260—233.3 A, 233.5